Figure 1:
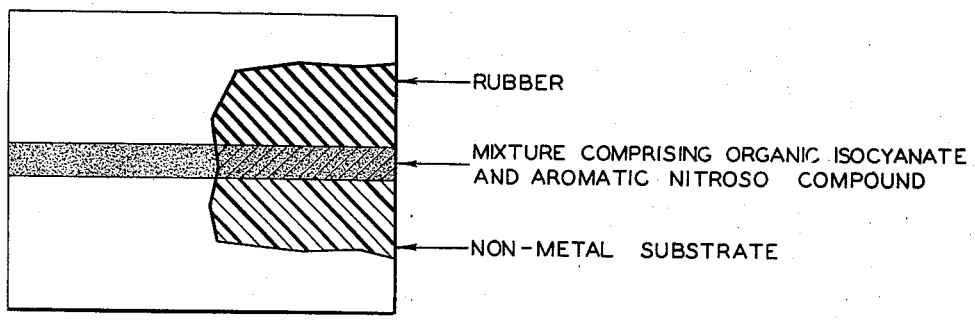

Sept. 22, 1959  E. W. COLEMAN, JR., ET AL  2,905,582
METHOD OF BONDING POLYURETHANER TO RUBBERS
Filed April 29, 1955

INVENTORS:
ELMER W. COLEMAN, JR.
DONALD M. ALSTADT
BY
Howson & Howson
ATTYS

United States Patent Office 2,905,582
Patented Sept. 22, 1959

2,905,582

METHOD OF BONDING POLYURETHANES TO RUBBERS

Elmer W. Coleman, Jr. and Donald M. Alstadt, Erie, Pa., assignors to Lord Manufacturing Company, Erie, Pa., a corporation of Pennsylvania Application April 29, 1955, Serial No. 505,024

2 Claims. (Cl. 154—139)

The present invention relates to a novel method for bonding olefinic rubber to non-metal substrates; and, in a more specific embodiment, the invention relates to a novel method for bonding an olefinic rubber body to a polyurethane rubber or resin body whereby an improved bond is obtained as compared to prior methods for bonding together bodies of these materials. The invention also relates to a novel product comprising a body of olefinic rubber bonded to a non-metal substrate, preferably a polyurethane resin or rubber, and to a novel adhesive composition therefor.

As is now known, the polyurethane rubbers possess excellent resistance to wear, sunlight, ozone, and general weathering. Because of these properties, polyurethane rubber is finding increasing application in the manufacture of articles, such as tires, shoe soles and heels, and the like. In many of these applications it is the practice to provide only an outer, exposed, layer of the polyurethane rubber bonded to a main body of olefinic rubber. For example, in the manufacture of tires it is presently the practice to prepare the tread of polyurethane rubber and the casing of an olefinic rubber, the polyurethane rubber tread being bonded to the olefinic rubber casing.

The difficulty in obtaining satisfactory bonds between polyurethane rubber and olefinic rubbers is well recognized. The most successful of the prior bonding agents or adhesives suggested to facilitate bonding are compositions comprising isocyanates. Even with these adhesives, however, the bond strength is not as great as is desired in most cases.

The use of isocyanates to bond olefinic rubbers to other non-metal substrates has also been suggested. In these cases also improved bonds would be desirable.

It is the principal object of the present invention to provide a novel method for bonding olefinic rubber to non-metal substrates.

It is another object of the present invention to provide a novel method for bonding an olefinic rubber body to a polyurethane rubber or resin body whereby are provided bond strengths such that, under stress, failure will occur in one or the other of the bodies rather than at the bond line.

Another object of the present invention is to provide a novel article of manufacture comprising an olefinic rubber body bonded to a non-metal substrate.

Still another object of the present invention is to provide a novel article of manufacture comprising an olefinic rubber body bonded to a polyurethane rubber or resin body to such a degree that failure will take place in one or the other of the bodies rather than at the bond line.

Other objects, including the provision of a novel adhesive composition, will become apparent from a consideration of the following specification and claims.

The bonding of olefinic rubber bodies to non-metal substrates in accordance with the present invention, comprises interposing between the olefinic rubber body and the non-metal substrate an intermediate bonding phase comprising an isocyanate and a nitroso compound, the isocyanate being at least available at the interface between the intermediate phase and the non-metal substrate and the nitroso compound being at least available at the interface between the intermediate phase and the olefinic rubber body, and heating the resulting assembly under pressure.

Figure 2:
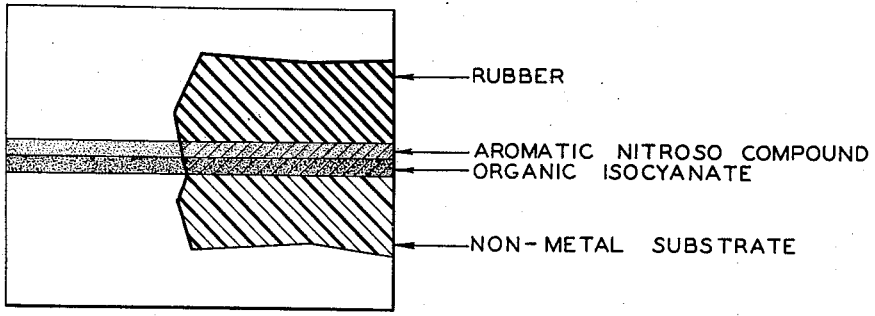

The present invention will be more readily understood from a consideration of the drawing in which:

Figure 1 is an end elevational view, partly in section, illustrating an assembly bonded in accordance with one embodiment of the invention, and Figure 2 is an end elevational view, partly in section, illustrating an assembly bonded in accordance with another embodiment of the invention.

It has been found that the bonding of olefinic rubber bodies to non-metal substrates in accordance with the method of the present invention provides bond strengths which are superior to those provided by prior methods. For example, in bonding olefinic rubber bodies to polyurethane bodies in accordance with the present invention, the bond strengths are quite often greater than the cohesive strength of the polyurethane body itself so that the polyurethane body and the olefinic rubber body cannot be separated without tearing into the polyurethane body. This is true even at elevated temperatures.

The present invention is broadly applicable to the bonding of olefinic rubber to non-metal substrates. As far as adhesion with the non-metal substrate is concerned, the isocyanate is the active material, and isocyanates will bond to any solid material having an internal covalent structure and possessing sites which associate with the isocyanate groups. This association may be by virtue of chemical reaction between the isocyanate groups and sites in the substrate reactable chemically therewith, principally hydrogen or other isocyanate groups. Thus, solid materials containing hydrogen, hydroxyl groups, aldehyde groups, carboxyl groups, amine groups, and the like, exemplified by synthetic and natural rubber; synthetic resins, such as polyamide resins (nylon type), polyester resins, phenol-aldehyde resins and urea-aldehyde resins; cellulose and cellulose derivatives, such as wood, rayon and cellulose ethers and esters; and leather bond by virtue of hydrogen sites. Polyurethane rubbers and resins, which contain isocyanate groups, bond principally through these isocyanate sites. The stated association may also be by virtue of electrical (physical) means, and such materials as glass and ceramics are examples of substrate materials which can be bonded by this mechanism. As stated, the present invention is particularly applicable to the bonding of olefinic rubber to polyurethane substrates, and the present invention will be more fully described hereinafter in terms of employing a polyurethane body as substrate. The substrate body to which the olefinic rubber body is bonded in accordance with the present invention may be in the form of a continuously solid product such as a sheet, block or the like, or may be in the form of fibers, filaments, yarns, cords, or the like, or fabrics containing these.

The polyurethane rubbers and resins, as is well known, are isocyanate-extended polyesters. That is to say, they are prepared by reacting an isocyanate compound, usually a diisocyanate, with a relatively high molecular weight polyester formed by reaction between a polyhydric alcohol and a polybasic acid. The particular polyhydric alcohol and polybasic acid selected depends, of course, upon the characteristics desired in the ultimate product. The reaction of the isocyanate with the polyester provides the typical urethane group, OCONHR, from which the product obtains its name. As is normally the case in the bonding of polyurethane rubbers and resins to another body employing heat and pressure, the polyurethane body employed in accordance with the present method will be in the uncured, that is, convertible, state.

The present invention, as stated, involves the bonding of an olefinic rubber body. Olefinic rubbers, as is well known, include natural rubbers and the unsaturated, synthetic rubbers such as polybutadiene, rubbery copolymers of butadiene and styrene (Buna S), rubbery copolymers of butadiene and acrylonitrile (Buna N), rubbery copolymers of butadiene and vinyl pyridine, rubbery copolymers of polychloroprene and ethylenically unsaturated compounds, polychloroprene, Butyl rubber, and the like.

The intermediate bonding phase for bonding the olefinic rubber body to the substrate in accordance with the present invention will comprise an isocyanate and a nitroso compound. Referring to the isocyanate, any organic compound containing an isocyanate (NCO) group or groups may be employed since it has been found that the isocyanate grouping is the functional material in the bonding phenomenon, the remainder of the molecule being relatively unimportant. There is a wide variety of isocyanates available which may be employed, ranging from simple organic monoisocyanate compounds up to polymeric materials containing isocyanate groups. Examples of isocyanate compounds are: the mono-isocyanates, such as the alkyl isocyanates, for instance ethyl isocyanate and octadecyl isocyanate, the aryl isocyanates, for instance phenyl isocyanate and alpha naphthyl isocyanate, and the like; the diisocyanates, such as the polymethylene diisocyanates, for instance, ethylene diisocyanate, trimethylene diisocyanate, 2-chlorotrimethylene diisocyanate, tetramethylene diisocyanate, pentamethylene diisocyanate, and hexamethylene diisocyanate, alkylene diisocyanates, for instance propylene-1,2-diisocyanate, butylene-1,2-diisocyanate and butylene-1,3-diisocyanate, alkylidene diisocyanates, for instance ethylidene diisocyanate and heptylidene diisocyanate, cycloalkylene diisocyanates, for instance cyclopentylene-1,3-diisocyanate, cyclohexylene-1,4-diisocyanate and cyclohexylene-1,2-diisocyanate, cycloalkane diisocyanates, for instance cyclohexane-1,4-diisocyanate, aromatic diisocyanates, for insance p-phenylene diisocyanate, 1-methylphenylene-2,4-diisocyanate, naphthylene-1,4-diisocyanate, o,o'-toluene diisocyanate, 5-nitro-1,3-phenylene diisocyanate, xylene-1,3-diisocyanate, 4,4'-diphenylenemethane diisocyanate, 4,4'-diphenylenepropane diisocyanate, benzidine diisocyanate, tolidine diisocyanate, and the like; corresponding to tri, tetra, etc., isocyanates, such as 1,2,4-benzene triisocyanate, triphenylmethane triisocyanate, and the like. Examples of polymeric material containing isocyanate groups which may be employed are phosgenated aniline-aldehyde resins, such as those disclosed in Patent Number 2,683,730. Polyurethane rubbers and resins containing the usual isocyanate curatives may also be relied upon to provide a portion of the isocyanate groups at the intermediate bonding phase. The preferred isocyanates comprise molecules containing at least two isocyanate groups, that is polyisocyanates, such as the diisocyanates, triisocyanates, polymers containing isocyanate groups, and the like. As stated, isocyanates have been used previously in the bonding of olefinic rubber to non-metal substrates and any of the isocyanates normally used may be employed, the particular isocyanate selected forming no part of the present invention.

In accordance with the present invention there is included in the intermediate phase along with the isocyanate, a nitroso compound. The nitroso compound employed will generally be an aromatic compound containing at least one nitroso group (—NO) attached directly to a ring carbon atom. Where two or more nitroso groups are present, as is preferred, they are attached to non-adjacent ring carbon atoms. The aromatic nucleus may be unsubstituted except for the nitroso group or groups, or may possess other substituents wherein one or more of the molecular hydrogens of the aromatic nucleus is replaced by alkyl, alkoxy, cycloalkyl, aryl, arylalkyl, arylamine, arylnitrosoamine, halogen, and the like, groups. Since the nitroso group is the functional portion of the nitroso compound insofar as the present invention is concerned, the presence of such substituents on the aromatic nucleus has little effect on the utility of the nitroso compound, and, as far as is presently known, there is no limitation as to the character of the substituents, and they may be organic or inorganic in nature. Hence, where reference is made herein to nitroso-"aromatic compound," "benzenes," or "naphthalenes" it will be understood to include such substituted derivatives as well as the unsubstituted nitroso compounds, unless otherwise specified. Hydroxy substituted nitroso aromatic compounds are stated in the literature to re-arrange with the nitroso group to form the oxime and, hence, are not considered nitroso compounds as herein defined. Ortho dinitroso compounds also do not exist as such and, hence, are not included herein.

The preferred nitroso aromatic compounds are the nitroso benzenes and naphthalenes. Of the nitroso compounds the dinitroso compounds are particularly preferred, especially the meta- or para-dinitroso benzenes and naphthalenes.

Examples of suitable nitroso compounds are:

2-nitrosoparacymene
Orthophenyl nitrosobenzene
4-chloronitrosobenzene
Paranitrosotoluene
4-methoxynitrosobenzene
2-benzyl nitrosobenzene
4-cyclohexylnitrosobenzene
Paraphenoxynitrosobenzene
Parabenzyloxynitrosobenzene
Metaoctylnitrosobenzene
3-pentadecyl-5-pentoxynitrosobenzene
3-cyclohexyl-5-nitrosotoluene
3-cyclopentyl-5-propoxynitrosobenzene
2-benzyl 5-decylnitrosobenzene
2-benzyl 5-methoxynitrosobenzene
2-phenylpentyl-5-isopropylnitrosobenzene
3-phenyl-5-nitrosotoluene
3-phenoxy-5-nitrosotoluene
2-methyl-5-phenylethyloxy nitrosobenzene
2-nitroso-4-phenylnitrosoaminetoluene
3-decyl-5-chloronitrosobenzene
3,5-dimethoxynitrosobenzene
2-phenyl-4-ethoxynitrosobenzene
2-phenoxy-4-butoxynitrosobenzene
2-phenyl-ethyloxy-5-butoxynitrosobenzene
2-ethoxy-4-phenylnitrosoaminenitrosobenzene
2-lauryloxy-4-bromonitrosobenzene
3,5-dicyclohexylnitrosobenzene
3-cyclopentyl-5-benzylnitrosobenzene
3-cyclopentyl-5-phenylnitrosobenzene
2-phenoxy 4-cyclohexylnitrosobenzene
2-phenylethoxy 4-cyclopentylnitrosobenzene
2-cyclohexyl 4-phenylnitrosoaminenitrosobenzene
2-cyclohexyl 4-chloronitrosobenzene
3,5-dibenzylnitrosobenzene
2-benzyl 4-phenylnitrosobenzene
2-phenylethyl 4-phenoxynitrosobenzene
2-phenylethyl 4-benzyloxynitrosobenzene
2-benzyl 4-phenylnitrosoaminenitrosobenzene
2-benzyl 4-bromonitrosobenzene
2,4-diphenylnitrosobenzene
2-phenyl 4-phenoxynitrosobenzene
2-phenyl 4-phenylethoxynitrosobenzene
2-phenyl 4-phenylnitrosoaminenitrosobenzene
2-phenyl 4-chloronitrosobenzene
2,4-diphenoxynitrosobenzene
2-phenoxy 4-benzyloxynitrosobenzene
4-phenyl-nitrosoaminenitrosobenzene
2-phenoxy 4-phenylnitrosoaminenitrosobenzene 2-phenoxy 4-chloronitrosobenzene
2,4-diphenylethoxy nitrosobenzene
2-phenylpropoxy 4-phenylnitrosoaminenitrosobenzene
2-benzyloxy 4-chloronitrosobenzene
2,4-diphenylnitrosoaminenitrosobenzene
2-chloro 4-phenylnitrosoaminenitrosobenzene
2,4-dichloronitrosobenzene
p-Nitrosophenyldiethanolamine
2-methylnitrosonaphthalene
6-cyclohexylnitrosonapththalene
4-benzylnitrosonaphthalene
2-ethoxynitrosonaphthalene
6-fluoronitrosonaphthalene
4-phenylnitrosoaminenitrosonaphthalene
2-ethyl-5-cyclopentylnitrosonaphthalene
1-methyl-7-benzylnitrosonaphthalene
5-butyl-8-ethoxynitrosonaphthalene
6-ethyl-7-fluoronitrosonaphthalene
2-cyclopentyl-8-benzylnitrosonaphthalene
2-cyclopentyl-4-bromonitrosonaphthalene
4-benzyl-8-butoxynitrosonaphthalene
2-benzyl-7-chloronitrosonaphthalene
1-ethoxy-8-fluoronitrosonaphthalene
1-ethyl-5-butylnitrosonaphthalene
5,8-dicyclopentylnitrosonaphthalene
2,6-dibenzylnitrosonaphthalene
2-ethoxy-7-amyloxynitrosonaphthalene
5,7-dichloronitrosonaphthalene
2-ethyl-3-methylnitrosonaphthalene
2-cyclopentyl-5-cyclohexylnitrosonaphthalene
1,5-diethoxynitrosonaphthalene
1,5-dichloronitrosonaphthalene
2,5-dinitrosoparacymene
5-chloro-1,3-dinitrosobenzene
2-fluoro-1,4-dinitrosobenzene
5-methoxy-1,3-dinitrosobenzene
2-cyclohexyl-1,4-dinitrosobenzene
2-methyl-1,4-dinitrosobenzene
2-cyclopentyl-1,3-dinitrosobenzene
2-benzyl-1,4-dinitrosobenzene
2-methoxy-1,3-dinitrosobenzene
2-chloro-1,4-dinitrosobenzene
2-methyl-5-cyclohexyl-1,3-dinitrosobenzene
2-ethyl-5-benzyl-1,4-dinitrosobenzene
2-isopropyl-5-methoxy-1,3-dinitrosobenzene
2-methyl-5-chloro-1,4-dinitrosobenzene
2-cyclohexyl-5-benzyl-1,3-dinitrosobenzene
2-cyclopentyl-5-ethoxy-1,4-dinitrosobenzene
2-cyclohexyl-5-fluoro-1,3-dinitrosobenzene
2-benzyl-5-isopropoxy-1,4-dinitrosobenzene
2-benzyl-5-bromo-1,3-dinitrosobenzene
2-methoxy-5-chloro-1,4-dinitrosobenzene
2-methyl-5-isopropyl-1,3-dinitrosobenzene
2,5-dicyclohexyl-1,4-dinitrosobenzene
2,5-dibenzyl-1,3-dinitrosobenzene
2-methoxy-5-isopropoxy-1,4-dinitrosobenzene
2,5-dichloro-1,3-dinitrosobenzene
2-methyl-3-ethyl-5-isopropyl-1,4-dinitrosobenzene
2-cyclohexyl-4,6-dicyclopentyl-1,3-dinitrosobenzene
2,3-dimethoxy-5-isopropoxy-1,4-dinitrosobenzene
2,4,5-trichloro-1,3-dinitrosobenzene
2,3-dimethoxy-5-cyclopentyl-1,4-dinitrosobenzene
2-methyl-4-benzyl-5-ethyl-1,3-dinitrosobenzene
2-isopropyl-3-methoxy-5-ethyl-1,4-dinitrosobenzene
2-methyl-4-fluoro-5-heptyl-1,3-dinitrosobenzene
2,5-dicyclohexyl-3-methyl-1,4-dinitrosobenzene
2,5-dicyclopentyl-4-benzyl-1,3-dinitrosobenzene
2,5-dicyclopentyl-3-ethoxy-1,4-dinitrosobenzene
2,5-dicyclohexyl-4-chloro-1,3-dinitrosobenzene
2,5-dibenzyl-3-methyl-1,4-dinitrosobenzene
2,5-dibenzyl-4-cyclohexyl-1,3-dinitrosobenzene
2,5-dibenzyl-3-methoxy-1,4-dinitrosobenzene
2,5-dibenzyl-4-fluoro-1,3-dinitrosobenzene
2-methyl-3-methoxy-6-amyloxy-1,4-dinitrosobenzene
2-cyclopentyl-4-methoxy-5-isopropoxy - 1,3 - dinitrosobenzene
2-ethoxy-3-benzyl-5-butoxy-1,4-dinitrosobenzene
2-fluoro-4-methoxy-6-butoxy-1,3-dinitrosobenzene
2,3-difluoro-5-heptyl-1,4-dinitrosobenzene
2,4-dichloro-5-cyclohexyl-1,3-dinitrosobenzene
2,5-dibromo-3-benzyl-1,4-dinitrosobenzene
2-chloro-4-fluoro-5-butoxy-1,3-dinitrosobenzene
2-ethyl-3-cyclopentyl-5-benzyl-1,4-dinitrosobenzene
2-methyl-4-butoxy-5-cyclohexyl-1,3-dinitrosobenzene
2-isopropoxy-3-chloro-5-cyclopentyl-1,4-dinitrosobenzene
2-benzyl-4-ethyl-6-amyloxy-1,3-dinitrosobenzene
2-methyl-3-benzyl-5-bromo-1,4-dinitrosobenzene
2-chloro-4-methoxy-5-heptyl-1,3-dinitrosobenzene
2-cyclohexyl-3-methoxy-5-benzyl-1,4-dinitrosobenzene
2-benzyl-4-fluoro-6-cyclopentyl-1,3-dinitrosobenzene
2-isopropoxy-3-chloro-6-cyclohexyl-1,4-dinitrosobenzene
2-benzyl-4-ethoxy-5-bromo-1,3-dinitrosobenzene
1,4-dinitrosonaphthalene
2-methoxy-1,4-dinitrosonaphthalene
2-methyl-7-isopropyl-1,4-dinitrosonaphthalene
2-methyl-1,4-dinitrosonaphthalene
6-cyclohexyl-1,3-dinitrosonaphthalene
4-benzyl-1,5-dinitrosonaphthalene
2-ethoxy-1,5-dinitrosonaphthalene
6-fluoro-1,7-dinitrosonaphthalene
2-ethyl-5-cyclopentyl-1,8-dinitrosonaphthalene
1-methyl-7-benzyl-2,6-dinitrosonaphthalene
5-butyl-8-ethoxy-2,7-dinitrosonaphthalene
6-ethyl-7-fluoro-1,4-dinitrosonaphthalene
2-cyclopentyl-8-benzyl-1,3-dinitrosonaphthalene
4-cyclohexyl-7-methoxy-1,5-dinitrosonaphthalene
2-cyclopentyl-4-bromo-1,6-dinitrosonaphthalene
4-benzyl-8-butoxy-1,7-dinitrosonaphthalene
2-benzyl-7-chloro-1,8-dinitrosonaphthalene
1-ethoxy-8-fluoro-2,6-dinitrosonaphthalene
1-ethyl-5-butyl-2,7-dinitrosonaphthalene
5,8-dicyclopentyl-1,4-dinitrosonaphthalene
2,6-dibenzyl-1,3-dinitrosonaphthalene
2-ethoxy-7-amyloxy-1,5-dinitrosonaphthalene
5,7-dichloro-1,6-dinitrosonaphthalene
2-ethyl-3-methyl-5-isopropyl-1,7-dinitrosonaphthalene
2-cyclopentyl-5,7-dicyclohexyl-1,8-dinitrosonaphthalene
1,5-diethoxy-8-butoxy-2,6-dinitrosonaphthalene
1,4,5-trichloro-2,7-dinitrosonaphthalene
2,5-diethyl-7-cyclohexyl-1,4-dinitrosonaphthalene
2-ethyl-6-benzyl-8-methyl-1,3-dinitrosonaphthalene
2-methyl-4-isopropoxy-8-ethyl-1,5-dinitrosonaphthalene
2-ethyl-4-chloro-5-heptyl-1,6-dinitrosonaphthalene
2,5-dicyclopentyl-4-methyl-1,7-dinitrosonaphthalene
2,6-dicyclohexyl-4-benzyl-1,8-dinitrosonaphthalene
1,5-dicyclohexyl-7-methoxy-2,6-dinitrosonaphthalene
1,5-dicyclopentyl-8-chloro-2,7-dinitrosonaphthalene
2,7-dibenzyl-5-methyl-1,4-dinitrosonaphthalene
2,7-dibenzyl-5-cyclopentyl-1,3-dinitrosonaphthalene
2,4-dibenzyl-8-methoxy-1,5-dinitrosonaphthalene
2,8-dibenzyl-5-chloro-1,6-dinitrosonaphthalene
2-ethyl-4-methoxy-5-amyloxy-1,7-dinitrosonaphthalene
2-cyclohexyl-4-ethoxy-6 - methoxy - 1,8 - dinitrosonaphthalene
1-methoxy-5-benzyl-7 - isopropoxy - 2,6 - dinitrosonaphthalene
1-chloro-6-methoxy-8 - isopropoxy - 2,7 - dinitrosonaphthalene
5,6-difluoro-8-heptyl-1,4-dinitrosonaphthalene
2,5-dichloro-7-cyclopentyl-1,3-dinitrosonaphthalene
2,7-dibromo-4-benzyl-1,5-dinitrosonaphthalene
2-fluoro-5-chloro-8-methoxy-1,6-dinitrosonaphthalene
2-methyl - 4 - cyclohexyl - 5 - benzyl - 1,7 - dinitrosonaphthalene
2-ethyl-4-methoxy - 5 - cyclopentyl - 1,8 - dinitrosonaphthalene 1-isopropoxy-4-bromo-8-cyclopentyl-2,6-dinitrosonaphthalene
1-benzyl-4-methyl-5-butoxy-2,7-dinitrosonaphthalene
5-propyl-7-benzyl-8-chloro-1,4-dinitrosonaphthalene
2-fluoro-6-isopropoxy-8-heptyl-1,3-dinitrosonaphthalene
2-cyclopentyl-4-benzyl-8-methoxy-1,5-dinitrosonaphthalene
4-benzyl-5-chloro-8-cyclohexyl-1,6-dinitrosonaphthalene
2-isopropoxy-6-fluoro-8-cyclopentyl-1,7-dinitrosonaphthalene
2-benzyl-5-butoxy-7-chloro-1,8-dinitrosonaphthalene and the like.

In carrying out the method of the present invention, an intermediate phase comprising the isocyanate and nitroso compound is interposed between the surface of the olefinic rubber body and the surface of the non-metal substrate which it is desired to bond together. In the intermediate bonding phase the isocyanate will at least be available at the interface between the non-metal substrate and the intermediate phase, and the nitroso compound will at least be available at the interface between the olefinic rubber body and the intermediate phase. Such an intermediate phase may conveniently be provided by the application of a mixture comprising the isocyanate and the nitroso compound, as illustrated in Figure 1, to the non-metal substrate and/or the olefinic rubber body, preferably the former. The intermediate phase may also be provided by applying the compounds separately as illustrated in Figure 2. In this connection any one of several procedures may be followed, including applying the nitroso compound to the olefinic rubber surface and the isocyanate to the non-metal substrate surface; applying the isocyanate to the non-metal substrate surface after which the nitroso compound is applied thereover, or the nitroso compound may be applied to the olefinic rubber surface following which the isocyanate may be applied thereover. As will be discussed more in detail hereinafter, in accordance with preferred practice of the present invention, the intermediate phase will also comprise a film-forming material. In this case the intermediate phase may be in the form of a pre-formed sheet comprising the isocyanate, nitroso compound and film-forming material. This pre-formed sheet may then merely be interposed between the non-metal substrate and the olefinic rubber body. The exact procedure followed is not critical, although preferably the isocyanate and nitroso compound, and film-forming material when used, are applied as an intimate admixture.

As stated, in accordance with the preferred embodiment of the present invention, the intermediate bonding phase will comprise a film-forming material. This material serves as a body for carrying the isocyanate or nitroso compound, or, preferably both. Any organic film-forming material may be employed for this purpose, although preferably a film-forming material possessing high cohesive strength is selected. Likewise, the particular film-forming material selected may also depend upon the nature of the bonded structure and its application. For example, if the structure is to be of a flexible nature, a flexible film-forming material may be employed. The organic film-forming material may be selected from a wide range of organic materials including synthetic resins, natural and synthetic elastomers, cellulose derivatives, and the like. Examples of synthetic resins and elastomers, that may be employed as the film-forming material are the polymers and copolymers of ethylenically unsaturated materials such as vinyl polymers and copolymers and after-halogenated derivatives thereof, copolymers of vinyl compounds and after-halogenated products thereof, polymers of conjugated dienes and after-halogenated products thereof, and the like; condensation polymers, such as phenol-aldehyde resins, aniline-aldehyde resins, epoxy resins, and the like. Especially suitable film-forming materials for use in the present invention are polychloroprene (poly 2-chlorobutadiene-1,3), poly 2,3-dichlorobutadiene-1,3 and after-brominated poly 2,3-dichlorobutadiene-1,3, such as those having a bromine content of between about 7.5 and about 42 mol percent, preferably between about 15 and about 36 mol percent. One of the principal components of the bonding phase may be an integral part of the film-forming material. For example, phosgenated aniline-aldehyde resin, which may serve as the isocyanate-supplying material as pointed out above may also serve as film-forming material. Likewise, polyurethane rubber or resin, that is, an isocyanate-extended polyester, itself serves as a particularly advantageous film-forming material, and in this case isocyanate groups present therein may be taken into account in making up the bonding phase.

The intermediate bonding phase may contain other materials which are included for any purpose desired. For example, particular ingredients may be included to increase the cohesive strength of the intermediate phase itself, such as usual compounding ingredients selected on the basis of a particular film-forming material. Likewise, catalysts, such as tertiary amines free of reactive hydrogens, which may accelerate the rate of reaction of the isocyanate may also be included with the isocyanate.

Referring to the relative proportions of the main components of the intermediate bonding phase, these may vary widely. As far as the isocyanate is concerned, the isocyanate group itself is the functional portion of that material. It has been found that this group should make up at least about 1%, by weight, of the solids in the intermediate bonding phase at least adjacent the non-metal substrate surface. The amount of isocyanate employed may be such that the isocyanate groups make up as much as 50–60%, by weight, of the solids in the intermediate bonding phase at least in the portion adjacent the non-metal substrate depending, of course, upon the particular isocyanate selected. Preferably, the amount of isocyanate employed is such as to provide between about 2 and about 25%, by weight, of isocyanate groups on the stated basis. For especially good bonds at elevated temperatures at least about 5% isocyanate groups on the stated basis is recommended. As far as the nitroso compound is concerned, in this case as in the case of the isocyanate, the functional portion of this compound is the nitroso (NO) group itself. Thus, the important factor is the amount of nitroso groups at least available at the interface between the olefin rubber and the intermediate bonding phase. In this connection, it has been found that the amount of nitroso compound employed should be such that the nitroso groups make up at least about 0.4%, by weight, of the solids in the intermediate bonding phase, at least adjacent to the olefinic rubber surface. The amount of nitroso compound, depending upon the nature thereof, employed may be such that the nitroso groups may make up as high as about 42%, by weight of the solids in the intermediate phase at least adjacent the olefinic rubber surface. Preferably, the amount of nitroso compound employed will be such that the nitroso groups make up between about .9 and about 22%, by weight, of the solids on the stated basis.

Reference has been made hereinabove to the application of the principal components of the adhesive bonding phase to one or the other or both of the surfaces to be joined. The particular state in which the components exist at the time of application is not critical in so far as the broader aspects of the invention are concerned, and one or more of the components may be applied in solid, finely-divided form, or in liquid form, most advantageously the latter. When applied in liquid form, one or more of the components, which may be a liquid, may serve as the vehicle, or an extraneous liquid vehicle, such as a solvent for one or more of the components, may be employed. Preferably at least one of the components is in solution at the time of application. In this connection, when a film-forming material is employed, it is preferably in solution during application, whereas the isocyanate or nitroso compound, particularly the latter, may merely be suspended in such solution. Such situation is included herein in the claims where reference is made to the application of the composition as a solution. As solvent there may be employed any organic liquid or mixtures thereof in which one or another or all of the ingredients to be applied is soluble at least to the extent dictated by the viscosity of the solution and the exact means of application to be employed. Any solvent employed should also be readily volatile so that lengthy drying periods are not encountered. The preferred solvents are aromatic hydrocarbons, such as benzene, toluene, xylene, and the like; the chlorinated aromatic hydrocarbons, such as mono-chlorobenzene, di-chlorobenzene, and the like; ketones, such as methyl ethyl ketone, and the like; esters, such as ethyl acetate, and the like. Alcohols are generally not employed in as-much-as the hydroxyl groups thereof are reactive with the isocyanate.

When a film-forming material is employed as part of the intermediate bonding phase it may be applied in admixture with the isocyanate or nitroso compound, or as is preferred, the three components may be mixed. In applying the materials in admixture, that is the mixed isocyanate and nitroso compound, as well as any film-forming material employed, it is preferred to apply such a mixture to the non-metal substrate.

After the adhesive components have been applied as described above and any solvent evaporated, the non-metal substrate surface and the olefinic rubber surface which are to be bonded are brought together, with the described intermediate bonding phase therebetween, and the assembly heated under pressure to cause vulcanization of the olefinic rubber, and of the substrate when of a vulcanizable nature, and bonding. As is well known in the art, the exact time and temperature of curing will vary depending upon the nature of the bodies bonded as well as on the nature of the particular ingredients in the adhesive phase. In general, however, the temperature during curing will be between about 250 and about 350° F., and the curing time will range from about 20 to about 100 minutes.

The present invention will be more readily understood from a consideration of the following specific examples which are given for the purpose of illustration only and are not intended to limit the scope of the invention in any way.

*Example I*

A freshly mixed adhesive consisting of 100 parts conventional gum polyurethane elastomer, 50 parts polyisocyanate produced by phosgenation of aniline-formaldehyde resin, 25 parts p-nitroso diphenyl amine, and 567 parts methyl ethyl ketone is applied to the surface of a freshly milled polyurethane rubber compound containing conventional polyisocyanate curatives and allowed to dry. A freshly sheeted slab of unvulcanized GR–S rubber compound consisting of 100 parts GR–S 1500 (butadiene-styrene copolymer), 50 parts HAF black (furnace black), 5 parts zinc oxide, 1 part stearic acid, 1.75 parts sulfur, and 1.25 N-cyclohexyl-2-benzothiazole sulfenamide is applied to the adhesive coated polyurethane rubber surface. The assembly is vulcanized under pressure for 60 minutes at 274° F. and removed from the mold. The assembly is post cured in an oven for 24 hours at 158° F. The bond which results is such that the polyurethane elastomer and GR–S rubber compound cannot be separated at room temperature or at 200° F. without tearing into the polyurethane elastomer.

*Example II*

A freshly mixed adhesive consisting of 100 parts conventional gum polyurethane elastomer, 50 parts polyisocyanate produced by phosgenation of aniline-formaldehyde resin, 10 parts N,4-dinitroso diphenyl amine and 567 parts methyl ethyl ketone, is brushed on the freshly milled polyurethane rubber containing conventional polyisocyanate curatives and allowed to dry. A freshly sheeted slab of unvulcanized natural rubber compound consisting of 100 parts smoked sheet, 50 parts HAF black (furnace black), 15 parts zinc oxide, 1 part stearic acid, 2 parts sulfur, 1.5 parts benzothiazyl disulfide and 2 parts zinc dimethyl dithiocarbamate, is applied to the adhesive coated polyurethane rubber surface. The assembly is vulcanized under pressure for 60 minutes at 274° F. and removed from the mold. The assembly is given an additional cure for 24 hours at 158° F. Examination of the assembly shows that a strong bond is formed.

*Example III*

A freshly mixed adhesive consisting of 100 parts conventional gum polyurethane elastomer, 50 parts polyisocyanate produced by phosgenation of aniline-formaldehyde resin, 25 parts p-dinitrosobenzene and 567 parts methyl ethyl ketone is applied to the surface of a freshly milled polyurethane rubber containing conventional polyisocyanate curatives and allowed to dry. An adhesive consisting of a binary mixture of gum polyurethane elastomer and polyisocyanate is processed along with the nitroso-containing adhesive and is applied to the surface of another polyurethane rubber body. A freshly sheeted slab of unvulcanized GR–S rubber compound consisting of 100 parts GR–S 1500 (butadienestyrene copolymer), 50 parts HAF black (furnace black), 5 parts zinc oxide, 1 part stearic acid, 175 parts sulfur, and 1.25 N-cyclohexyl-2-benzothiazole is applied to the adhesive-coated surfaces. The assemblies are vulcanized under pressure for 60 minutes at 274° F. and removed from the mold. The assemblies are given an additional cure of 24 hours at 158° F. The assembly produced with the binary mixture can be separated readily, the failure occurring in the bonding phase and between the bonding phase and GR–S compound. The bond produced with the nitroso-containing adhesive is such that the polyurethane and GR–S rubber cannot be separated at room temperature or 200° F. without tearing into the polyurethane elastomer.

*Example IV*

A ternary adhesive employed in Example III is applied to a freshly sheeted polyurethane rubber compound containing conventional polyisocyanate curatives and allowed to dry. A binary mixture such as employed in Example III is processed along with the nitroso-containing adhesive. A freshly sheeted slab of unvulcanized natural rubber compound consisting of 100 parts smoked sheet, 50 parts HAF black, 15 parts zinc oxide, 1 part stearic acid, 2 parts sulfur, 1.5 parts benzothiazyl disulfide and .2 part zinc dimethyl dithiocarbamate is applied to the coated polyurethane rubber surfaces. The assemblies are vulcanized under pressure for 60 minutes at 274° F. and removed from the mold. The assemblies are cured for 24 hours at 158° F. The assembly produced with the binary mixture can be separated readily, the failure occurring in the bonding phase and between the bonding phase and natural rubber compound. The bond produced with the nitroso-containing adhesive is such that the polyurethane and natural rubber elastomer cannot be separated at room temperature or 200° F. without tearing into the polyurethane elastomer.

*Example V*

A freshly mixed adhesive consisting of 100 parts neoprene type WRT, 50 parts polyisocyanate produced by phosgenation of aniline formaldehyde resin, 25 parts p-dinitrosobenzene, and 567 parts methyl ethyl ketone, is applied to the surface of a freshly milled polyurethane rubber compound containing conventional polyisocyanate curative and allowed to dry. A freshly sheeted slab of unvulcanized natural rubber compound such as employed in Example IV is applied to the coated polyurethane rubber surface. The assembly is cured under the conditions described in Example IV.

*Example VI*

A freshly mixed adhesive consisting of 100 parts afterbrominated poly 2,3-dichlorobutadiene-1,3 (approximately 20% Br by weight), 25 parts polyisocyanate produced by phosgenation of aniline formaldehyde resin, 25 parts p-dinitrosobenzene and 400 parts monochlorobenzene is applied to the surface of a freshly milled polyurethane rubber compound containing conventional polyisocyanate curatives and allowed to dry. A slab of unvulcanized GR-S rubber compound such as employed in Example I is applied to the coated polyurethane rubber surface. The assembly is cured under the conditions described in Example I. The bond which is formed is such that the polyurethane elastomer and GR-S rubber compound cannot be separated at room temperature or 200° F. without tearing into the polyurethane elastomer.

*Example VII*

A freshly mixed adhesive such as employed in Example VI is applied to the surface of a freshly milled polyurethane rubber compound containing conventional polyisocyanate curatives. A slab of unvulcanized natural rubber compound such as employed in Example II is applied to the coated polyurethane rubber surface. The assembly is cured under the conditions described in Example I. The bond which is formed is such that the polyurethane elastomer and natural rubber compound cannot be separated at room temperature or 200° F. without tearing into the polyurethane elastomer.

*Example VIII*

A freshly mixed adhesive consisting of 100 parts afterbrominated poly 2,3-dichlorobutadiene-1,3 (approximately 20% Br by weight), 25 parts orthotolidine diisocyanate, 25 parts p-dinitrosobenzene, and 400 parts monochlorobenzene is applied to the surface of a freshly milled polyurethane rubber compound containing conventional polyisocyanate curatives and allowed to dry. A slab of unvulcanized GR-S stock such as employed in Example I is applied to the coated polyurethane rubber surface. The assembly is vulcanized under pressure for 60 minutes at 274° F. and removed from the mold. The assembly is oven cured for 24 hours at 158° F. The bond which results is such that the polyurethane elastomer and GR-S rubber compound cannot be separated without tearing into the body of the polyurethane elastomer.

*Example IX*

A freshly mixed adhesive such as employed in Example VIII is applied to the surface of a freshly milled polyurethane rubber compound containing conventional polyisocyanate curatives and allowed to dry. A slab of unvulcanized natural rubber stock such as employed in Example II is applied to the coated polyurethane rubber surface. The assembly is vulcanized under pressure for 60 minutes at 274° F. and removed from the mold. The assembly is oven curved for 24 hours at 158° F. The bond which results is such that the polyurethane elastomer and natural rubber compound cannot be separated at room temperature or at 200° F. without tearing into the body of the polyurethane elastomer.

*Example X*

A freshly mixed adhesive consisting of 100 parts neoprene type WRT, 25 parts orthotolidine diisocyanate, 25 parts p-dinitrosobenzene and 567 parts methyl ethyl ketone is applied to the surface of a freshly milled polyurethane rubber compound containing conventional polyisocyanate curatives and allowed to dry. A freshly sheeted slab of unvulcanized GR-S rubber compound consisting of 100 parts GR-S 1500, 40 parts channel black, .5 parts zinc oxide, 2 parts sulfur, 2 parts benzothiazyl disulfide, is applied to the coated polyurethane rubber surface. The assembly is vulcanized under pressure for 60 minutes at 274° F., and removed from the mold. The assembly is oven cured for 24 hours at 158° F. The bond which results is such that the polyurethane elastomer and GR-S rubber compound cannot be separated without tearing into the polyurethane elastomer.

*Example XI*

A freshly mixed adhesive consisting of 100 parts conventional gum polyurethane elastomer, 25 parts orthotolidine diisocyanate, 25 parts p-dinitrosobenzene and 567 parts methyl ethyl ketone is applied to the surface of a freshly milled polyurethane rubber compound containing conventional polyisocyanate curatives and allowed to dry. A freshly sheeted slab of the unvulcanized natural rubber compound such as employed in Example II, is applied to the adhesive coated polyurethane rubber surface. The assembly is vulcanized under pressure for 60 minutes at 274° F. and removed from the mold. The assembly is given an additional cure of 24 hours at 158° F. The bond which results is such that the polyurethane elastomer and natural rubber compound cannot be separated at room temperature or at 200° F. without tearing into the polyurethane elastomer.

*Example XII*

A freshly mixed adhesive consisting of 100 parts conventional gum polyurethane elastomer, 50 parts polyisocyanate produced by phosgenation of aniline formaldehyde resin, 25 parts 2,5 dinitroso-p-cymene and 567 parts methyl ethyl ketone is applied to the surface of a freshly milled polyurethane rubber compound containing conventional polyisocyanate curatives. A freshly sheeted slab of the unvulcanized GR-S rubber compound such as employed in Example I is applied to the adhesive coated polyurethane rubber surface. The assembly is vulcanized under pressure for 60 minutes at 274° F. and removed from the mold. The assembly is post cured in an oven for 24 hours at 158° F. The bond produced is such that the polyurethane elastomer and the GR-S rubber compound cannot be separated at room temperature or at 200° F. without tearing into the polyurethane elastomer.

*Example XIII*

A freshly mixed adhesive consisting of 100 parts conventional gum polyurethane elastomer, 50 parts polyisocyanate produced by phosgenation of aniline formaldehyde resin, 50 parts 2,4-dinitroso naphthalene and 567 parts methyl ethyl ketone is applied to the surface of a freshly mixed polyurethane rubber compound containing conventional poly isocyanate curatives. A freshly sheeted slab of the unvulcanized natural rubber compound such as employed in Example II is applied to the coated polyurethane rubber surface. The assembly is vulcanized under pressure for 60 minutes at 274° F. and removed from the mold. The assembly is oven cured for 24 hours at 158° F. Examination of the assembly shows that a strong bond is formed.

*Example XIV*

A freshly mixed adhesive consisting of 100 parts conventional gum polyurethane elastomer, 50 parts polyisocyanate produced by phosgenation of aniline formaldehyde resin, 50 parts p-dinitrosobenzene, and 567 parts methyl ethyl ketone, is applied to the surface of a freshly milled polyurethane rubber containing conventional polyisocyanate curatives and allowed to dry. A freshly sheeted slab of unvulcanized neoprene, type WRT, rubber compound consisting of 100 parts neoprene WRT, .5 part stearic acid, 4 parts magnesium oxide, 2 parts phenyl-beta-naphthylamine, 50 parts furnace black, 5 parts zinc oxide, and .5 part 2-mercapto imidazoline is applied to the adhesive coated polyurethane surface. The assembly is cured under the conditions described in Example XIII.

The bond which results is such that the polyurethane elastomer and neoprene rubber compound cannot be separated without tearing into the polyurethane elastomer.

Adhesive compositions that may be employed in accordance with the present invention are specifically claimed in copending applications Serial Numbers 504,714 and 504,878, both filed April 29, 1955.

Considerable modification is possible in the selection of the components of the intermediate bonding phase, as well as in the particular techniques followed in carrying out the present invention without departing from the scope thereof.

We claim:

1. The method of bonding polyurethane resin and rubber bodies to bodies of rubber selected from the group consisting of natural rubbers and unsaturated synthetic rubbers containing carbon-to-carbon double bonds which comprises interposing between the polyurethane body and the rubber body an intermediate bonding phase comprising an organic isocyanate, an aromatic nitroso compound and an organic, polymeric, film-forming agent selected from the group consisting of synthetic resins and natural and synthetic elastomers, said isocyanate being at least available at the interface between the intermediate bonding phase and said polyurethane body, said nitroso compound being at least available at the interface between the intermediate bonding phase and said rubber body in an amount to provide at least 0.9%, by weight, of nitroso groups in said intermediate bonding phase at least adjacent said rubber body and at least one of said isocyanate and said nitroso compound being incorporated in said film-forming agent, and heating the resulting assembly under pressure.

2. The method of claim 1 wherein said film-forming material comprises brominated poly-2,3-dichlorobutadiene-1,3.

References Cited in the file of this patent

UNITED STATES PATENTS

| | | |
|---|---|---|
| 2,400,474 | Ten Broeck | May 14, 1946 |
| 2,436,222 | Neal et al. | Feb. 17, 1948 |
| 2,548,505 | Turner et al. | Apr. 10, 1951 |
| 2,581,920 | Kuhn | Jan. 8, 1952 |
| 2,616,876 | Rehner et al. | Nov. 4, 1952 |
| 2,650,212 | Windemuth | Aug. 25, 1953 |
| 2,690,780 | Cousins | Oct. 5, 1954 |
| 2,713,884 | Schwartz | July 26, 1955 |
| 2,720,479 | Crawford et al. | Oct. 11, 1955 |
| 2,749,960 | Schartz | June 12, 1956 |
| 2,835,624 | Cousins | May 20, 1958 |

FOREIGN PATENTS

| | | |
|---|---|---|
| 118,839 | Australia | Aug. 17, 1944 |
| 456,911 | Canada | May 28, 1949 |
| 515,675 | Great Britain | Mar. 5, 1937 |

OTHER REFERENCES

Rubber Chemistry and Technology, "New Types of Highly Elastic Substances Vulcollans," October–December 1950; vol. No. 23, Issue No. 4; pp. 812–834.

Modern Plastics, April 1954, "Polyurethane Resins," pp. 143, 144, 146, 228–229.